United States Patent [19]

McCurdy et al.

[11] Patent Number: 4,990,884
[45] Date of Patent: Feb. 5, 1991

[54] METHOD AND APPARATUS FOR TESTING AN AIRBAG RESTRAINT SYSTEM

[75] Inventors: Roger A. McCurdy, Troy; Dana A. Stonerook, Plymouth, both of Mich.; Richard J. Mann, Los Angeles, Calif.; Edward J. Abeska, Ferndale; Jeffrey R. Rochette, Livonia, both of Mich.

[73] Assignee: TRW Inc., Lyndhurst, Ohio

[21] Appl. No.: 449,718

[22] Filed: Dec. 12, 1989

[51] Int. Cl.[5] .............................................. B60R 21/32
[52] U.S. Cl. .................................... 340/438; 280/735
[58] Field of Search ...................... 340/425.5, 436, 438; 280/734, 735; 307/10.1

[56] References Cited

U.S. PATENT DOCUMENTS

| | | |
|---|---|---|
| 3,622,974 | 11/1971 | Best et al. ........................... 340/438 |
| 3,629,816 | 12/1971 | Gillund . |
| 3,633,159 | 1/1972 | Dillman et al. . |
| 3,668,627 | 6/1972 | Brainerd . |
| 3,714,627 | 1/1973 | Dillman et al. . |
| 3,745,523 | 7/1973 | Lewis et al. . |
| 3,774,151 | 11/1973 | Lewis et al. . |
| 3,863,208 | 1/1975 | Balban . |
| 4,163,268 | 7/1979 | Spies et al. . |
| 4,278,431 | 7/1981 | Yasui et al. . |
| 4,287,431 | 9/1981 | Yasui et al. . |
| 4,825,148 | 4/1989 | McCurdy et al. . |
| 4,835,513 | 5/1989 | McCurdy et al. . |

Primary Examiner—Joseph A. Orsino
Assistant Examiner—Brian R. Tumm
Attorney, Agent, or Firm—Tarolli, Sundheim & Covell

[57] ABSTRACT

A test circuit for an airbag restraint system is disclosed and provides an accurate determination of the operativeness of a storage capacitor and calculates the resistance of inertia switch resistors. The capacitor is tested by discharging and charging the capacitor. The values of the inertia switch resistors are determined by switching known resistive values in parallel with the inertia switch resistors. Based on the monitored voltage values during the switching, resistance values are calculated.

26 Claims, 6 Drawing Sheets

METHOD AND APPARATUS FOR TESTING AN AIRBAG RESTRAINT SYSTEM

TECHNICAL FIELD

The present invention relates to diagnostic testing of an airbag restraint system and is particularly directed to a method and apparatus for testing (i) the operativeness of a storage capacitor and (ii) the impedance values of inertia switch resistors in an airbag restraint system.

BACKGROUND ART

Airbag restraint systems for passenger vehicles are known in the art. Such systems typically include an actuation circuit and a diagnostic circuit. The actuation circuit includes at least one inertia switch connected in series with a detonating device, e.g., a squib, and a source of electrical energy. The diagnostic circuit tests the operativeness of the actuation circuit and controls actuation of an indicator to inform the vehicle operator of a detected system error. Such diagnostic circuits typically monitor voltage values at various test points in the actuation circuit and compares the monitored voltage values against predetermined limits. When a monitored voltage value is outside of its predetermined limits, a system error has occurred.

Airbag restraint systems receive their operating power from the vehicle battery. When vehicle deceleration exceeds a value sufficient to close the inertia switches in the restraint system, e.g., during a vehicle crash, a squib is "fired" and the airbag is inflated. The battery provides the electrical energy to fire a squib. Typical airbag restraint systems include a storage capacitor that functions as either a main power source or as a back-up power source should the actuation circuit become disconnected from the vehicle battery during a crash.

The storage capacitor in such airbag restraint systems must have a sufficient capacitance value to insure that an adequate supply of electrical energy will be available to fire the squib. Some prior art diagnostic circuits monitor the static, steady-state voltage developed across the capacitor. An incorrect capacitance value, however, cannot be detected by simply monitoring the static steady-state voltage developed across the capacitor.

U.S Pat. No. 3,714,627 discloses a diagnostic circuit for an airbag restraint system that tests the operativeness of a storage capacitor. The voltage developed at a connection terminal of the storage capacitor is compared to the charge voltage developed across a test capacitor during initial energization of the restraint system. If the voltage value at the terminal of the storage capacitor is greater than the charge across the test capacitor during this initial energization period, such occurrence indicates that the storage capacitor is open circuited. An error indication is provided to the vehicle operator upon such occurrence.

Another known diagnostic circuit for an airbag restraint system is shown in FIG. 1. A squib 10 has one terminal connected to electrical ground through an 0.1 Ohm resistor 12. The other terminal of the squib 10 is connected to capacitors 14, 16. Capacitor 14 is connected to a source of electrical energy V(up) through a diode 18 and a current limiting resistor 20. Capacitor 16 is connected to the source of electrical energy V(up) through a diode 18 and a current limiting resistor 22. The capacitors 14, 16 charge through the squib 10. A voltage is developed across each capacitor 14, 16 substantially equal to V(up). The current limiting resistors 20, 22 prevent the squib 10 from "firing" during the charging of the capacitors 14, 16.

The capacitors 14, 16 are connected to one terminal of an inertia switch 24 through diodes 26, 28, respectively. The other terminal of inertia switch 24 is connected to electrical ground. A resistor 29 is connected in parallel with the inertia switch 24. When the inertia switch 24 closes, the capacitors 14, 16 discharge thereby pulling current through the squib 10 of sufficient magnitude and duration to "fire" the squib.

The capacitors 14, 16 are further connected to field-effect-transistors ("FETs") 30, 32 through resistors 34, 36, respectively. Each FET 30, 32 is controllably connected to a microcomputer 38. The junction of resistor 20 and capacitor 14 is connected to a voltage dividing network 40 including resistors 42, 44 connected in series to electrical ground. The junction of resistor 22 and capacitor 16 is connected to a voltage dividing network 46 including resistors 48, 50 connected in series to electrical ground.

The junction of resistors 42, 44 is connected to an analog-to-digital ("A/D") converter 52. The junction of resistors 48, 50 is connected to the A/D converter 52. The A/D converter is operatively connected to the microcomputer 38. The microcomputer 38 is connected to an indicator 54.

The circuit shown in FIG. 1 tests the operativeness of capacitors 14, 16, serially, i.e., separately. The microcomputer 38 partially discharges one of the capacitors being tested. The microcomputer monitors the voltage across the capacitor being tested through its associated resistor network 40, 46 and its associated connection with the A/D converter 52. If the monitored voltage across the capacitor being tested, which is now partially discharged, is not greater than a predetermined limit, e.g., as would occur when the capacitor is open circuited or is not a proper value, the indicator 54 is energized to warn the vehicle operator of the detected error.

The capacitor test in the system shown in FIG. 1 requires a separate switching FET for each capacitor and a separate voltage dividing network connected to the A/D converter for each capacitor. Also, each capacitor test is time consuming. Because each airbag restraint system must be fully tested during the manufacturing process, such a long period of time needed to complete a test sequence is not desirable. It is, therefore, desirable to decrease the time needed for completion of a test sequence to decrease manufacturing time of the system.

Another concern with airbag diagnostic test circuits is an ability to monitor the operativeness of the system's inertia switches. To accomplish this goal, each inertia switch in known airbag restraint systems includes an associated resistor connected in parallel therewith. Each inertia switch resistor is connected in series with other inertia switch resistors of the system and with the squib. The inertia switch resistors and the squib form a voltage dividing network. A monitoring circuit monitors the voltage at connection terminals of the inertia switches. Based upon the monitored voltage values, the monitoring circuit determines if an inertia switch is electrically short circuited or electrically open circuited. The value of inertia switch resistors must be sufficient to limit the steady state current flow through the squib to a value well below that required to "fire"

the squib. It is, therefore, desirable to be able to accurately measure the impedance of each inertia switch resistor to determine if its value is within predetermined limits.

U.S. Pat. No. 4,835,513 to McCurdy et al., and assigned to the assignee of the present application, discloses a method and apparatus for accurately measuring the impedance of each inertia switch resistor and for determining the operativeness of the system's storage capacitor.

SUMMARY OF THE INVENTION

The present invention provides a new and improved method and apparatus for testing an airbag restraint system. The invention provides an accurate determination of the operativeness of a storage capacitor in an airbag restraint system of the type having first and second inertia switches, one connected to each side of a squib. The invention also provides an accurate determination of the value of parallel connected inertia switch resistors.

In accordance with the present invention, an apparatus is provided for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance is greater than a predetermined value, a sufficient electrical potential would be available to fire the squib from the capacitor's stored electrical energy when the first and second inertia switches close. The apparatus comprises means for monitoring the voltage value across the capacitor at a time $T_0$, the voltage value at time $T_0$ being equal to $V_C(T_0)$. The apparatus further includes means for partially discharging the capacitor starting from the time $T_0$ for a predetermined time period ending at a time $T_1$. Means are included for monitoring the voltage value of the charge remaining across the capacitor at time $T_1$, the monitored voltage value across the capacitor at time $T_1$ being a voltage value equal to $V_C(T_1)$. Means are provided for determining a value according to algorithm $$\frac{V_C(T_0) + V_C(T_1)}{V_C(T_0) - V_C(T_1)}$$

The apparatus further comprises means for comparing the determined value against a predetermined limit and for providing a signal indicative of the comparison, and means for providing a failure indication to the vehicle operator if the comparing means indicates that the determined value is less than the predetermined limit.

In accordance with another aspect of the present invention, an apparatus is provided for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance is greater than a predetermined value, a sufficient electrical potential would be available to fire the squib from the capacitor's stored electrical energy when the first and second inertia switches close. The apparatus comprises means for monitoring the voltage value across the capacitor at a time $T_0$, the voltage value across the capacitor at time $T_0$ being equal to $V_C(T_0)$, means for partially discharging the capacitor starting from the time $T_0$ for a predetermined time period ending at a time $T_1$. Means are provided for monitoring the voltage value of the charge remaining across the capacitor at time $T_1$, the monitored voltage value across the capacitor at time $T_1$ being a voltage value equal to $V_C(T_1)$. Means are provided for determining a value according to algorithm $$\frac{V_C(T_1)}{V_C(T_0)}$$

The apparatus further includes means for comparing the determined value against a predetermined limit and, for providing a signal indicative of the comparison and means for providing a failure indication to the vehicle operator if the comparing means indicates that the determined value is less than the predetermined limit.

In accordance with another aspect of the present invention, an apparatus is provided for testing a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance value C is greater than a predetermined value, a sufficient electrical potential would be available to fire the squib from the capacitor's stored electrical energy when the first and second inertia switches close. The apparatus comprises means for monitoring the voltage value across the capacitor at a time $T_0$, the voltage value across the capacitor at time $T_0$ being equal to $V_C(T_0)$. Means are provided for partially discharging the capacitor for a predetermined time period ending at a time $T_1$, the means for partially discharging said capacitor including a solid state switching device connected in series with a resistor, the series combination of the switching device and the resistor being connected in parallel with the capacitor and a timing circuit controllably connected to the solid state switching device for controlling the ON time of the switching device, the source of electrical energy remaining continuously connected to the capacitor during the testing of the capacitor. Means are provided for monitoring the voltage value of the charge remaining across the capacitor at time $T_1$, the monitored voltage value across the capacitor at time $T_1$ being a voltage value equal to $V_C(T_1)$. Means are provided for determining the capacitance value C according to algorithm $$C = \frac{t}{R \cdot \ln\left[\frac{V_C(T_0) - V_f}{V_C(T_1) - V_f}\right]}$$

where t=the discharge time=$(T_1-T_0)$, R=the equivalent charge/discharge composite resistance, and $V_f$=the final voltage value across the capacitor if the means for partially discharging the capacitor were to remain ON for a substantial time period. The apparatus further includes means for providing a failure indication to the vehicle operator if the determined capacitance value is less than a predetermined limit.

In accordance with yet another aspect of the present invention, an apparatus is provided for testing a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance value C is greater than a predetermined value, a sufficient electrical potential would be available to fire the squib from the capacitor's stored electrical energy when the first and second inertia switches close. The apparatus comprises means for monitoring the voltage value across the capacitor at a time $T_0$, the voltage value across the capacitor at time $T_0$ being equal to $V_C(T_0)$. Means are provided for partially discharging the capacitor for a predetermined time period ending at a time $T_1$, the means for partially discharging the capacitor including a solid state switching device connected in series with a test resistor, the series combination of the switching device and the test resistor being connected in parallel with the capacitor and a timing circuit controllably connected to the solid state switching device for controlling the ON time of the switching device, the source of electrical energy remaining continuously connected to the capacitor during the testing of the capacitor. Means are provided for monitoring the voltage value of the charge remaining across the capacitor at time $T_1$, the monitored voltage value being a second voltage value equal to $V_C(T_1)$. The apparatus further includes means for determining the capacitance value C according to algorithm $$C = \frac{t}{2R} \cdot \left[ \left( \frac{V_C(T_0) + V_C(T_1)}{V_C(T_0) - V_C(T_1)} \right) - \left( \frac{2V_f}{V_C(T_0) - V_C(T_1)} \right) \right]$$

where R = the charge/discharge composite resistance, t = the discharge time of the capacitor = $(T_1 - T_0)$, and $V_f$ = the final voltage value across the capacitor if the means for partially discharging the capacitor were to remain ON for a substantial time period. Means are provided for providing a failure indication to the vehicle operator if the determined capacitance value is less than a predetermined limit.

In accordance with yet another aspect of the present invention, an apparatus is provided for testing an airbag restraint system of the type including a squib, a first inertia switch connected to one terminal of the squib and to a source of electrical energy, a second inertia switch connected to the other terminal of the squib and to electrical ground, each of the inertia switches including an associated resistor connected in parallel across its associated switch, the resistor associated with said first inertia switch having a resistance value defined as R(IS1). The apparatus comprises a first switching network connected in parallel with the first inertia switch, the first switching network including a first actuatable solid state switch connected in series with a first test resistor having a known resistance value for, when actuated, connecting the first test resistor in parallel with the associated resistor of the first inertia switch. A second switching network is connected in parallel with the second inertia switch. The second switching network includes a second actuatable solid state switch connected in series with a second test resistor having a known resistance value for, when actuated, connecting the second test resistor in parallel with the associated resistor of the second inertia switch, the resistance value of the second test resistor being equal to the resistance value of the first test resistor. Means are provided for controlling the first and second solid state switches so as (i) in a first condition having the second solid state switch ON and the first solid state switch OFF, and (ii) in a second condition, having the first solid state switch ON and the second solid state switch OFF. The apparatus further includes means for monitoring the voltage value of the source of electrical energy and for monitoring the voltage values at a junction between the squib and one of the inertia switches when one of the solid state switching devices are in the first and second conditions, the monitored voltage value for the first condition being defined as $V_F$ and the monitored voltage value for said second condition being defined as $V_{F'}$. Means are provided for calculating the resistance value of the resistor associated with the first inertia switch from the monitored voltage values solving an algorithm according to:

$$R(IS1) = \left( \frac{V_{F'}}{V_F} - 1 \right) \cdot K$$

where K is a constant having a value which is functionally related to the value of the first and second test resistors. In accordance with a preferred embodiment, the resistance values of both the first and second test resistors are equal to one-thousand Ohms and the calculating means calculate the resistance value of the resistor associated with the first inertia switch according to the algorithm $$R(IS1) = \frac{V_{F'}}{V_F} - 1$$

where the term $$\frac{V_{F'}}{V_F} - 1$$

is in one-thousand Ohms units.

In accordance with still yet another aspect of the present invention, an apparatus is provided for testing an airbag restraint system of the type including a squib, a first inertia switch connected to one terminal of the squib and to a source of electrical energy having a value $V_C$ a second inertia switch connected to the other terminal of the squib and to electrical ground, each of the inertia switches including an associated resistor connected in parallel across its associated switch, the resistor associated with the second inertia switch having a value defined as R(IS2). The apparatus comprises a first switching network connected in parallel with the first inertia switch, the first switching network including a first actuatable solid state switch connected in series with a first test resistor having a known resistance value for, when actuated, connecting the first test resistor in parallel with the associated resistor of the first inertia switch. A second switching network is provided connected in parallel with the second inertia switch, the second switching network including a second actuatable solid state switch connected in series with a second test resistor having a known resistance value for, when actuated, connecting the second test resistor in parallel with the associated resistor of the second inertia switch, the resistance value of the second test resistor being equal to the resistance value of the first test resistor. Means are provided for controlling the first and second solid state switches so as (i) in a first condition having the second solid state switch ON and the first solid state switch OFF, and (ii) in a second condition, having the first solid state switch ON and the second solid state switch OFF. Means are provided for monitoring the voltage value of the source of electrical energy and for monitoring the voltage values at a junction between the squib and one of the inertia switches when one of the solid state switching devices are in the first and second conditions, the monitored voltage value for the first condition being defined as $V_F$ and the monitored voltage value for the second condition being defined as $V_{F'}$. The apparatus further includes means for calculating the resistance value of the resistor associated with the second inertia switch from the monitored voltage values solving an algorithm according to:

$$R(IS2) = \left(\frac{V_{F'} - V_F}{V_C - V_{F'}}\right) \cdot K$$

where K is a constant having a value which is functionally related to the value of the first and second test resistors. In accordance with a preferred embodiment, the resistance values of both the first and second test resistors are equal to one-thousand Ohms and the calculating means solves a reduced algorithm according to $$R(IS2) = \frac{V_{F'} - V_F}{V_C - V_{F'}}$$

where the term $$\frac{V_{F'} - V_F}{V_C - V_{F'}}$$

is in one-thousand Ohms units.

BRIEF DESCRIPTION OF THE DRAWINGS

Other features and advantages of the present invention will become apparent to those skilled in the art from a reading of the following description of a preferred embodiment with reference to the accompanying drawings, in which.

DESCRIPTION OF A PREFERRED EMBODIMENT

Figure 1:
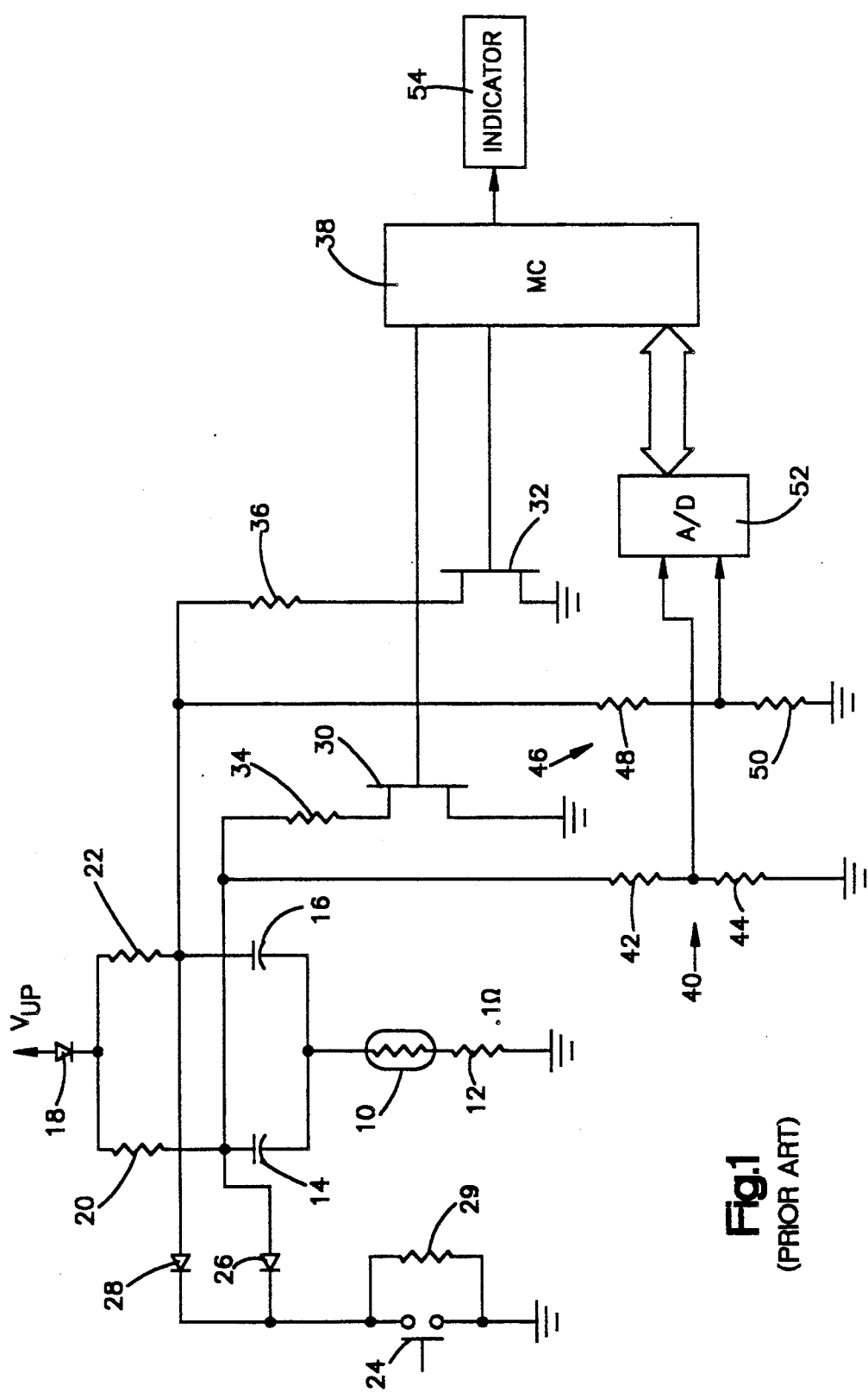
FIG. 1 is a schematic illustration of a portion of a prior art airbag restraint system that includes a test of a storage capacitor's operativeness.
Figure 2:
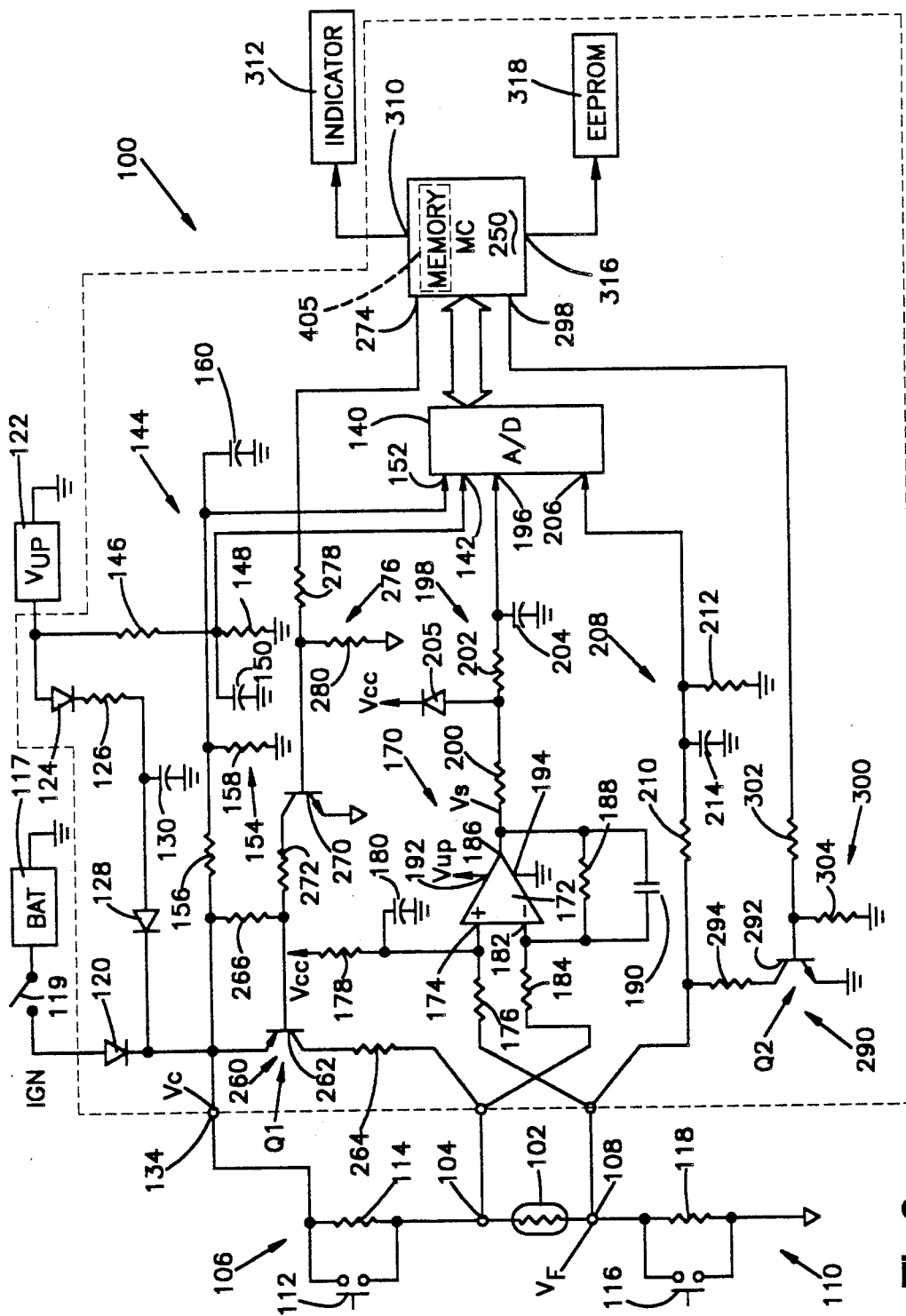
FIG. 2 is a schematic illustration of an apparatus for testing an airbag restraint system in accordance with the present invention.

Referring to FIG. 2, a circuit 100 in accordance with the present invention for use in an airbag restraint system is shown. The circuit 100 includes a squib 102 having a first terminal 104 connected to a first inertia switch assembly 106. The squib 102 includes a second terminal 108 connected to a second inertia switch assembly 110.

The inertia switch assembly 106 includes a normally open inertia switch 112 and a parallel connected resistor 114. The assembly 106 is referred to as the safing sensor. The inertia switch assembly 110 includes a normally open inertia switch 116 and a parallel connected resistor 118. The assembly 110 is referred to as the front sensor. Typically, the safing sensor is located on the interior compartment of the vehicle and the front sensor is located at a remote location near the front of the vehicle.

The front sensor 110 has its second terminal connected to electrical ground. The second terminal 134 of the safing sensor 106 is connected to the vehicle battery 117 through the vehicle's ignition switch 119 and a diode 120. The second terminal 134 of the safing sensor is also connected to the output of a voltage up converter 122 through the series connection of a diode 124, resistor 126, and diode 128.

The value of the output voltage from $V_{up}$ 122, in the preferred embodiment, is substantially greater than the value of the battery voltage received through the ignition switch. The $V_{up}$ voltage is used to charge capacitor 130 connected between the junction of resistor 126 and diode 128 and electrical ground. It will be appreciated that the voltage charge on the capacitor 130 is equal to the value of the $V_{up}$ voltage minus the voltage drop across diode 124 and resistor 126. A voltage present at terminal 134, which is the cathode side of diode 128, is equal to the voltage charge on capacitor 130 minus the value of the voltage drop across the diode 128. The voltage present at terminal 134 is referred to as $V_C$. $V_C$, under normal operation, is substantially greater than the value of the battery voltage so that the diode 120 is reversed biased.

The values of resistors 114 and 118 are sufficient to maintain a steady-state current flow through the squib 102 which is substantially less than that necessary to fire the squib. The resistors 114, 118 in combination with the squib 102 form a voltage dividing network. A voltage value is present at terminals 104, 108 which is a ratiometric division of the voltage $V_C$. Typically, the resistance value of the squib 102 is approximately 2 ohms. Preferably, the resistance values of resistors 114, 118 are typically 5 kohms each. Therefore, a voltage will be present at terminals 104, 108 equal to approximately ½ the voltage $V_C$.

An analog-to-digital converter ("A/D") 140 is used to monitor the voltage values at various test points within the circuit 100. A first input 142 of A/D converter 140 is connected to the output of the voltage up converter 122 through a resistor divider network 144 which includes resistors 146, 148 connected between the output of the voltage up converter 122 and electrical ground. A filter capacitor 150 is connected between the junction of resistors 146, 148 and electrical ground. A second input 152 of A/D converter 140 is connected to the voltage $V_C$ at terminal 134 through a resistor dividing network 154 which includes resistors 156, 158 connected in series between the terminal 134 and electrical ground. A filter capacitor 160 is electrically connected between the junction of resistors 156, 158 and electrical ground.

A differential amplifier circuit 170 is used to monitor the voltage developed across the squib 102. The differential amplifier circuit 170 includes an operational amplifier 172 having its noninverting input 174 connected to the terminal 108 through a resistor 176. The noninverting input 174 is also connected to a DC electrical energy source, designated $V_{cc}$, through a resistor 178. Voltage $V_{cc}$ is used to bias the noninverting input 174. Noninverting input 174 is further connected to a filter capacitor 180. The second terminal of capacitor 180 is connected to electrical ground.

The inverting input 182 of the operational amplifier 172 is connected to terminal 104 through a resistor 184. The operational amplifier 172 includes an output 186 which is electrically connected to the inverting input 182 through a parallel connection of a resistor 188 and a capacitor 190. The power supply connection terminals 192, 194 of the operational amplifier 172 are connected to the output of the voltage up converter $V_{up}$ 122 and electrical ground, respectively.

The output 186 of the operational amplifier 172 is connected to an input terminal 196 of the A/D converter 140 through series connected resistors 200 and 202. A filter capacitor 204 is connected between one terminal of resistor 202 and electrical ground. A diode 205 has its anode connected to the junction of resistors 200, 202 and its cathode connected to $V_{cc}$. The purpose of diode 205 is to prevent over voltages from being applied to the input 196 of the A/D 140 upon power down of the circuit 100. The detailed operation of the differential amplifier circuit 170 is fully described in U.S. Pat. No. 4,825,148, issued Apr. 25, 1989 to McCurdy et al., and assigned to the assignee of the present application, the disclosure of which is hereby fully incorporated herein by reference.

An input terminal 206 of A/D converter 140 is connected to terminal 108 through a resistor dividing network 208 which includes resistors 210, 212 connected in series between the junction 108 and electrical ground. A filter capacitor 214 is electrically connected between the junction of resistors 210, 212 and electrical ground. The voltage value present at the terminal 108 is referred to as $V_F$. The output 186 of the operational amplifier 172 is referred to as $V_S$.

The A/D converter 140 is operatively connected to a microcomputer 250. The connection with and cooperation between an A/D converter and a microcomputer are well known in the art and therefore will not be described in detail herein. Briefly, the microcomputer addresses an input of the A/D converter. The A/D converter serially outputs a binary number to the microcomputer wherein the number is indicative of the analog voltage present at the addressed input. The microcomputer 250 is programmed with algorithms that account for the values of divide-down resistors present in the circuit 100. For example, when measuring the voltage $V_F$ at terminal 108, the voltage present at the input 206 of the A/D converter 140 is divided by resistors 210, 212. The microcomputer 250 accounts for the divide-down resistors in its determination of the voltage value present at terminal 108.

A first switching circuit 260 is electrically connected in parallel with the safing sensor 106. The switching circuit 260 includes a PNP transistor 262 having its emitter connected to the terminal 134. The collector of transistor 262 is connected to terminal 104 through a resistor 264. The base of transistor 262 is connected to the terminal 134 through a resistor 266. The base of transistor 262 is further connected to the collector of an NPN transistor 270 through a resistor 272. The emitter of transistor 270 is connected to electrical ground. The base of transistor 270 is electrically connected to an output 274 of microcomputer 250 through a resistor dividing network 276. The resistor dividing network 276 includes resistors 278, 280 connected in series between the output 274 and electrical ground. The base of transistor 270 is connected to the junction of resistors 278, 280.

A second switching circuit 290 is connected in parallel with the front sensor 110. The second switching circuit 290 includes an NPN transistor 292 having its collector connected to the terminal 108 through a resistor 294. The emitter of transistor 292 is connected to electrical ground. The base of transistor 292 is connected to an output 298 of microcomputer 250 through a resistor dividing network 300. The resistor dividing network 300 includes resistors 302, 304 connected in series between the output 298 of microcomputer 250 and electrical ground. The base of transistor 292 is connected to the junction of resistors 302, 304.

The transistors 262, 292 are respectively referred to as Q1, Q2. The microcomputer 250 controls actuation of the transistors Q1, Q2 so as to selectively place resistors 264, 294 in parallel with resistors 114, 118, respectively.

The microcomputer 250 further includes an output 310 connected to an indicator 312 located within the vehicle compartment and clearly visible to the vehicle operator. The indicator 312 is used to provide an indication to the vehicle operator of a detected error within the circuit 100. The microcomputer 250 further includes an output 316 electrically connected to a nonvolatile memory 318, such as an electrically erasable, programmable read only memory ("EEPROM"). The EEPROM is used to record failure information for later analysis by service technicians.

The present invention provides an accurate measurement of the impedance value of each of the inertia switch resistors 114, 118, tests the operativeness of capacitor 130 to insure that the capacitor is properly connected, and test that the capacitor has a correct, or, at least, a minimum capacitance value. The circuit 100 performs the resistor and capacitor tests in parallel, i.e., the two tests are performed simultaneously. A capacitor short test is also performed by monitoring the voltage value $V_C$ through input 152 of A/D converter 140. If the microcomputer 250 determines $V_C < 18$ VDC, the capacitor 130 is considered to be short circuited.

Figure 3A:
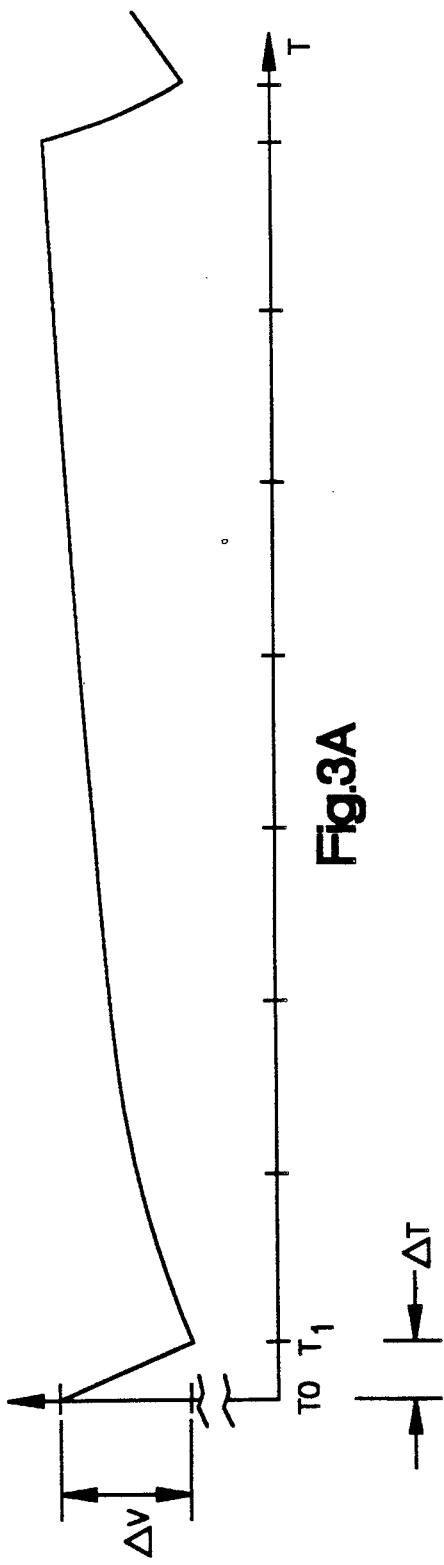
FIGS. 3A, 3B, and 3C are graphical representations of waveforms present in the apparatus of FIG. 2.
Figure 3B:
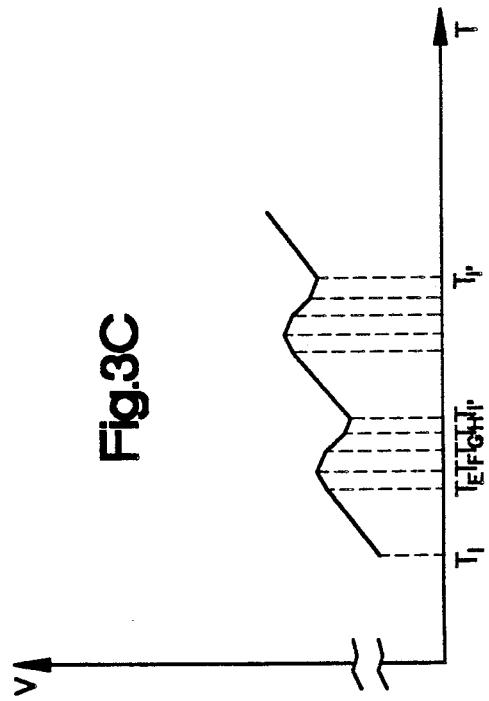
Figure 3C:
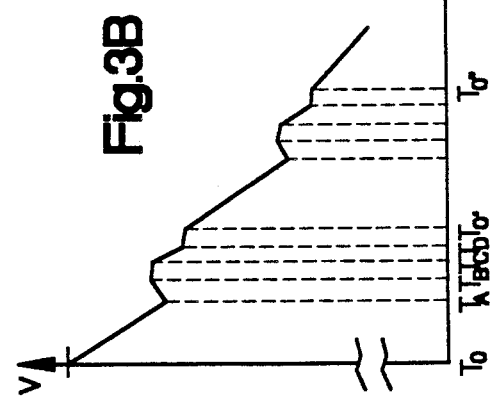
Figure 4A:
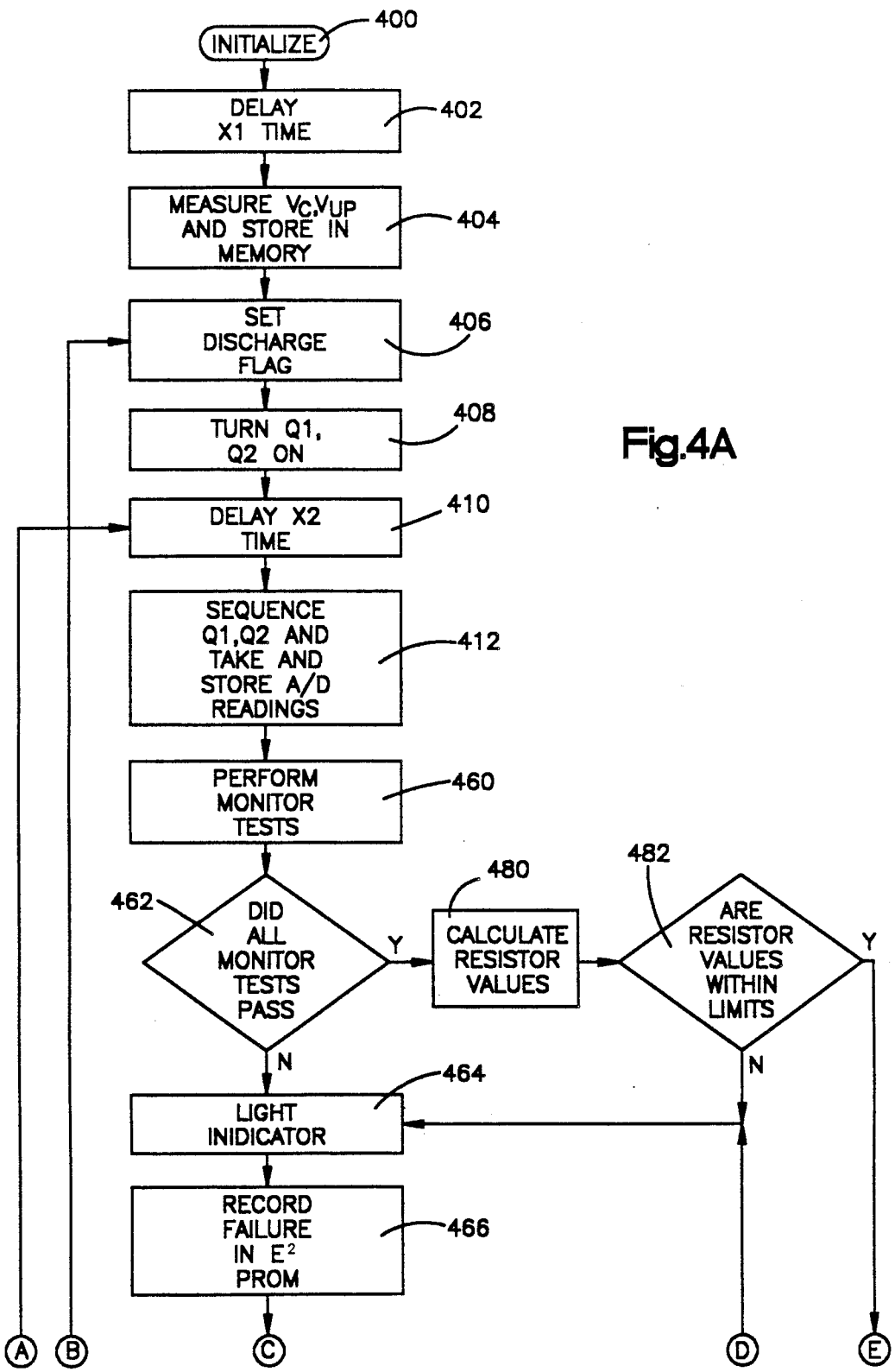
FIGS. 4A and 4B show a single flow chart illustrating operational logic steps followed by the apparatus of FIG. 2.

Referring to FIGS. 3A, 3B, 3C, 4A, 4B, and 5, the operation of the present invention will be appreciated. Referring first to FIG. 4A, in step 400, the system is initially powered up upon the vehicle operator starting the vehicle. The microcomputer 250 delays any further operation of the circuit 100 for an amount of time X1. The time delay X1 is sufficient to insure that the capacitor 130 is fully charged. This delay occurs in step 402. In step 404, the microcomputer measures the value of the voltage $V_C$ present at terminal 134 and measures the value of the voltage $V_{up}$. Both measured values are stored in the microcomputer's internal memory 405. To test the capacitance value of capacitor 130, the capacitor is partially discharged, i.e., permitted to discharge over a predetermined time period. To accomplish this partial discharge, the microcomputer sets a discharge flag in step 406 and turns ON both transistors Q1 and Q2 in step 408. When transistors Q1 and Q2 are ON, resistor 264 is in parallel with resistor 114 and resistor 294 is in parallel with resistor 118. This parallel resistor combination results in a drop in the value of voltage $V_C$ present at terminal 134.

Referring to FIG. 3A, if the transistors Q1 and Q2 are turned, ON at time $T_0$ and are turned OFF at time $T_1$, the voltage $V_C$ will drop by an amount equal to $\Delta V$. If at time $T_1$, the transistors Q1 and Q2 are both turned OFF, the capacitor 130 begins to charge up to the value which is $V_{up}$ minus the voltage drop across diode 124 and resistor 126. If the capacitance value of capacitor 130 is greater than a predetermined minimum, the voltage drop $\Delta V$ will be less than a predetermined maximum value. At time $T_1$, the microcomputer can monitor the voltage at $V_C$. If the voltage drop $\Delta V$ from time $T_0$ to $T_1$ is greater than the predetermined limit, then such is an indication that the capacitance value of capacitor 130 is less than a predetermined minimum.

It has been discovered that the criteria of $$V_C(T_0) - V_C(T_1) < \text{limit}_1 \tag{1}$$

provides adequate accuracy to diagnose low capacitance, i.e., a capacitance value of less than a predetermined value. The accuracy of this test measurement is functionally related to the value of $V_{up}$ and $V_{cc}$, which serves as the ratiometric reference of the A/D 140, but not the values of resistors 156 and 158. The tolerance variations of resistors 156 and 158 is effectively cancelled out by the calculation.

An improved algorithm which substantially cancels out the effects of variations in $V_{cc}$ and $V_{up}$ is as follows:

$$\frac{V_C(T_0) + V_C(T_1)}{V_C(T_0) - V_C(T_1)} < \text{limit}_2 \tag{2}$$

The effect of this division is to substantially cancel out ratiometric variations in $V_{cc}$, $V_{up}$, and the voltage drops across diodes 124 and 128. The only significant variance remaining results in the uncertainty in the A/D conversion and truncation errors associated with the divide operation in the microcomputer 250.

The preferred algorithm mathematically reduces equation (2) to:

$$\left(\frac{V_C(T_1)}{V_C(T_0)}\right) \cdot 256 < \text{Limit}_3 \tag{3}$$

which further reduces the variability of the solution to uncertainty in the A/D conversion This capacitance test can be considered an adjusted test, i.e., adjusted for variations in $V_{cc}$, $V_{up}$, and the voltage drops across diodes 124, 128.

An alternate test which is not as accurate as the preferred method of equation number (3) but is none the less valuable as an independent check, i.e., for use in end of line testing, is a calculation of the actual capacitance value of capacitor 130. Accordingly, $$V_C(T_1) = V_C(T_0)e^{-t/\tau} + V_f(1 - e^{-t/\tau}) \tag{4}$$

where $\tau = RC$, R is the equivalent charge/discharge composite resistance, t is the discharge time $(T_1 - T_0)$, and $V_f$ is the final voltage reached if Q1, Q2 are left on for a substantial time period with the supply voltage $V_{up}$ connected. Solving equation (4) for C leads to:

$$C = \frac{t}{R \cdot \ln\left[\frac{V_C(T_0) - V_f}{V_C(T_1) - V_f}\right]} \tag{5}$$

Using the Taylor series approximation for the natural log:

$$\ln X = 2 \cdot \left[\left(\frac{x-1}{x+1}\right) + 1/3 \cdot \left(\frac{x-1}{x+1}\right)^3 + 1/5 \cdot \left(\frac{x-1}{x+1}\right)^5 + \ldots\right] \tag{6}$$

This provides a series which converges rapidly allowing an approximation of:

$$\ln X \approx 2 \cdot \left(\frac{x-1}{x+1}\right) \tag{7}$$

Substituting the approximation of equation (7) into equation (5) leads to:

$$C \approx \frac{t}{2R} \cdot \left(\frac{V_C(T_0) + V_C(T_1) - 2V_f}{V_C(T_0) - V_C(T_1)}\right) \tag{8}$$

Equation (8) can be rewritten as:

$$C \approx \frac{t}{2R} \cdot \left[\left(\frac{V_C(T_0) + V_C(T_1)}{V_C(T_0) - V_C(T_1)}\right) - \left(\frac{2V_f}{V_C(T_0) - V_C(T_1)}\right)\right] \tag{9}$$

where C is capacitance, t is the discharge time $T_1 - T_0$, and R is the equivalent charge/discharge composite resistance. Assume R=490 Ohms, T=300 msec, $V_C(T_0)$ =23 volts, $V_C(T_1)$=22 volts, and $V_f$=19 volts. Solving equation (9) results in:

$$C = \frac{.3}{2(490)} \cdot (45 - 38) \tag{10}$$

or $$C = 2143 \ \mu F \tag{11}$$

Such a calculation is easily implemented into a simple algorithm as:

$$C \approx \frac{300 \cdot [V_C(T_1) + V_C(T_0) - 150]}{V_C(T_0) - V_C(T_1)} \tag{12}$$

Since $V_f$ and R are estimated values, the accuracy of equation (12) is lower than that of equation (3). However, a test according to equation (9) is useful in that it reduces test time and increases "confidence" that the algorithm of equation (3) is providing correct information.

Assume that the expected voltage drop with Q1 and Q2 ON over a 295 millisecond time period between $T_0$ and $T_1$ is 2.5 volts. If $V_{up}$ and $V_{cc}$ are at their nominal values, a nominal result will be calculated. If the $V_{up}$ voltage is higher than nominal, $V_C$ will also be higher than nominal, and the A/D readings for both $V_C(T_0)$ and $V_C(T_1)$ will increase proportionally. The division effectively cancels out the increase in $V_{up}$ and variations in $V_{cc}$. As a result, the division of $V_C(T_0)$ by $V_C(T_1)$ is automatically compensated for normal variations in circuit components.

The capacitor 130 must be of sufficient capacitance value to insure that a sufficient amount of electrical energy will be available to fire the squib 102. The electrical energy supplied by the capacitor must be available for a predetermined amount of time after the battery becomes disconnected from $V_{up}$ and the ignition switch 119. Therefore, the capacitance value of capacitor 130 is substantial. The discharge/charge cycle depicted in FIG. 3A typically takes seven seconds to complete. Applicants have found that it is possible to test other portions of the control circuit simultaneous with the testing of the capacitor 130.

Referring again to FIGS. 4A and 4B, the microcomputer delays an amount of time X2 in step 410 after the transistors Q1, Q2 are both turned ON. Referring to FIG. 3B, the delay time X2 is depicted as the time between $T_0$ and $T_A$. In step 412, the microcomputer begins to sequence Q1 and Q2 through various ON and OFF states. The voltage values at each switched state are measured and stored for later use. The detail of step 412 is shown in the flow chart of FIG. 5.

In step 420, the microcomputer 250 turns Q1 and Q2 OFF. After Q1 and Q2 are turned OFF, the microcomputer delays a predetermined amount of time in step 422. Referring to FIG. 3B, transistors Q1 and Q2 turning OFF occurs at time $T_A$ and the delay time is equal to the amount of time between $T_A$ and $T_B$. At time $T_B$, the microcomputer in step 424 reads the voltage values present at all the A/D input channels and stores these values in its memory 405. The capacitor 130 is chargng during the time period between $T_A$ and $T_B$. At time $T_B$, the microcomputer in step 426 turns ON transistor Q1. The microcomputer then delays a predetermined time in step 428. The time delay in step 428 is depicted in FIG. 3B as the time between $T_B$ and $T_C$. During this time period, the capacitor 130 is discharging at a rate slower than when both transistors Q1 and Q2 are ON. At time $T_C$, the microcomputer, in step 430, reads the voltage values present at $V_C$ and $V_F$ and stores them in its memory 405. At time $T_C$, the microcomputer, in step 432, turns ON transistor Q2 and delays a predetermined amount of time in step 434. The predetermined amount of time in step 434 is depicted as the time between $T_C$ and $T_D$ in FIG. 3B. During the time period between $T_C$ and $T_D$ the transistors Q1 and Q2 are both ON and the capacitor 130 discharges at the same rate as occurs between times $T_0$ and $T_A$. At time $T_D$, the microcomputer in step 436 reads the voltages values present at $V_C$, $V_F$, and $V_S$ and stores these values in its memory 405. At time $T_D$, the microcomputer in step 438 turns transistor Q1 OFF and delays for a predetermined amount of time in step 440. The time delay 440 is depicted as the time between $T_D$ and $T_{0'}$ in FIG. 3B. During this time period, the capacitor 130 continues to discharge but at a slower rate than when Q1 and Q2 are both turned ON. At time $T_{0'}$, the microcomputer, in step 442, reads the voltage values present at $V_C$ and $V_F$ and stores these readings in its memory 405.

In step 444, the microcomputer determines whether the discharge flag has been set. If the discharge flag has been set, transistor Q1 is turned ON in step 446 and the program returns to the main program in step 448. It will be appreciated that step 446 insures that both transistors Q1 and Q2 are both ON so as to continue the discharge portion of the capacitor test If the determination in step 444 is negative, which means that the capacitor 130 is in its charging mode, the program proceeds to step 450 where transistor Q2 is turned OFF Step 450 insures that both transistors Q1 and Q2 are OFF which would charge the capacitor 130.

Referring back to FIGS. 4A, 4B, the microcomputer performs a series of monitor tests in step 460. The monitor tests are gross measurements of the values of resistors 114, 118, squib 102, and capacitor 130, so as to insure that no open circuit or short circuit exits. The first test conducted in the series of monitor tests by the microcomputer 250 is a check for an open circuit of squib 102 by monitoring the voltage value present at input 196. If the voltage value at 196 is less than 1 volt, the squib 102 is considered open-circuited.

The second test conducted in the series of monitor tests by the microcomputer 250 is to recall the value of the voltage value that was present at terminal 134 when transistors Q1 and Q2 were OFF and to recall the value of voltage present at the terminal 134 when transistors Q1 and Q2 were ON. The microcomputer 250 then performs an algorithm to determine if:

$$V_C(Q1, Q2 \text{ OFF}) - V_C(Q1, Q2 \text{ ON}) > 1.63 \text{ volts}( \tag{13}$$

If the result of the algorithm (equation (13)) is true, then the capacitor 130 is considered open-circuited.

The third test conducted in the series of monitor tests by the microcompter 250 is to recall the value of the voltage that was present at terminal 108 when the transistor Q2 was ON and to recall the value that was present at terminal 108 when the transistor Q1 was turned ON. The microcomputer 250 then performs the following algorithms to determine if:

$$V_F(Q1 \text{ on}) > 6.20 \text{ volts} \tag{14}$$

and $$\frac{V_F(Q2 \text{ ON})}{V_F(Q1 \text{ ON})} \leq .11 \tag{15}$$

If these conditions are true, it is assumed that the safing sensor 106 is open circuited. If such occurs, this is a monitor test failure. After all the monitor tests are completed, the program proceeds to step 462 where the microcomputer determines whether all the monitor tests have passed. If the algorithm (15) is true, the program proceeds to step 464 where the indicator light is lit. The program then proceeds to step 466 where the failure is recorded in the EEPROM. The program then proceeds to step 468 where the microcomputer monitors the time occurrence of the failure and begins to time and record the duration that the failure exists in the EEPROM. The program then proceeds to step 470.

The other monitor tests conducted in step 460 include recalling of the charge value across the capacitor $V_C$ and the voltage value present at terminal 108 when Q1 and Q2 were OFF and also the front value present at terminal 108 when the transistor Q2 is turned ON. The microcomputer 250 then performs the following algorithms to determine if:

$$V_C - V_F(Q2 \text{ ON}) < .6 \text{ volts} \tag{16}$$

or $$\left(\frac{V_{F(Q1,Q2\ OFF)}}{V_C} > .51\right. \tag{17}$$

and $$\left.\frac{V_{F(Q2\ ON)}}{V_{F(Q1,Q2\ OFF)}} > .35\right) \tag{18}$$

If either equation (16) or equations (17) and (18) are true, the microcomputer assumes that the safing sensor is shorted. Otherwise, the microcomputer then proceeds to recall the value of the voltage present at terminal 108 when Q1 and Q2 were OFF, the value of the voltage present at terminal 134, and the value of the voltage present at terminal 108 when the transistor Q1 was ON. The program then proceeds to perform the following algorithms to determine if:

$$V_F(Q1\ ON) < .6 \text{ volts} \tag{19}$$

or $$\left(\frac{V_F}{V_C} < .51\right. \tag{20}$$

and $$\left.\frac{V_{F(Q1\ ON)}}{V_C} < .78\right) \tag{21}$$

If either equation (19) or equations (20) and (21) are true, the microcomputer assumes that the front sensor 110 is short circuited. Otherwise, the microcomputer recalls the voltage value at terminal 108 when Q1 and Q2 were OFF and the value of the terminal 108 when the transistor Q1 was ON, the value of terminal 108 with Q2 ON, and the value of $V_C$, and performs the following algorithm to determine if:

$$\frac{V_C - V_F}{V_{F(Q1\ ON)} - V_{F(Q2\ ON)}} < .40 \tag{22}$$

If equation (22) is true, the microcomputer assumes that the front sensor 110 is open-circuited. Otherwise, the microcomputer recalls the value of input 196 with transistors Q1 and Q2 ON and performs the following algorithm to determine if:

$$V_S(Q1, Q2\ ON) < 1 \text{ volt} \tag{18}$$

If equation (23) is true, the squib 102 is considered open-circuited. This test prevents a squib of resistance greater than 15 ohms from being detected erroneously as a shorted squib.

If no failures have occurred in step 460, it is assumed that the resistors 114, 118, squib 102, and capacitor 130 are electrically connected and that their component values are within a range that can be measured by the circuit 100. If all the tests pass, the program branches from step 462 to step 480 where the microcomputer calculates the resistance values of the resistors 114, 118 and squib 102. To calculate the resistances of resistor 114, 118 the following equation can be used:

$$V_F = V_C \cdot \left[\frac{R(118)}{R(118) + R(114)}\right] \tag{24}$$

When transistor Q1 is OFF and Q2 is ON, the voltage then present at terminal 108 is defined as $V_{F'}$, and can be expressed by the following equation:

$$V_{F'} = V_C \cdot \left[\frac{R}{R(114) + R}\right] \tag{25}$$

Where the resistance R is equal to the following:

$$R = \left[\frac{R(118) \cdot R(294)}{R(118) + R(294)}\right] \tag{26}$$

Therefore, the resistance value of resistor 118 is solved by the following equation:

$$R(118) = \left[\frac{V_C \cdot (V_F - V_{F'})}{V_{F'} \cdot (V_C - V_F)}\right] \cdot R(294) \tag{27}$$

If the value of resistor 294 is selected to be 1 kohms, then equation (27) reduces to:

$$R(118) = \left[\frac{V_C \cdot (V_F - V_{F'})}{V_{F'} \cdot (V_C - V_F)}\right] \tag{28}$$

Where the resistance of resistor 118 is expressed in kohms. By substituting equation (28) into equation (24), the resistance value of resistor 114 is calculated according to the equation:

$$R(114) = \left[\frac{V_C \cdot (V_F - V_{F'})}{V_F \cdot V_{F'}}\right] \tag{29}$$

Equation (29) assumes that the value of resistor 294 is 1 kohms and therefore the resistance value of resistor 114 expressed by equation (29) is in kohms.

It will be appreciated that the resistance values for resistors 114, 118 were derived by measurements taken by only two cycles of the transistors Q1 and Q2, i.e., the measurement when Q1 and Q2 were OFF and the measurements when Q1 was OFF and Q2 was ON. It will be appreciated that the same calculations could have been made with the measurements when Q1 and Q2 were OFF and the measurements when Q1 was ON and Q2 was OFF. If $V_{F''}$ is the voltage value present at terminal 108 when transistor Q1 is ON and Q2 is OFF, the resistance values R(114) and R(118) are solved according to the following equations:

$$R(114) = \left[\frac{V_C \cdot (V_{F''} - V_F)}{V_F \cdot (V_C - V_{F''})}\right] \tag{30}$$

$$R(118) = \left[\frac{V_C \cdot (V_{F''} - V_F)}{(V_C - V_{F''}) \cdot (V_C - V_F)}\right] \tag{31}$$

The voltage values $V_C$, $V_F$, $V_{F'}$ and $V_{F''}$ are measured through the A/D converter 140. The preferred method of calculating the front sensor resistance of resistor 118 is presented in equation (28). The preferred method of testing the resistance of resistor 114 is accomplished by recognizing that:

$$V_{F'} = \left[ \frac{R(118)}{R_1 + R(118)} \right] \quad (32)$$

Where $R_1$ is the parallel combination of resistors 114 and 264:

$$R_1 = \left[ \frac{R(114) \cdot R(264)}{R(114) + R(264)} \right] \quad (33)$$

By substituting $R_1$ of equation (33) into (32), equation (32) becomes:

$$V_{F'} = \left[ \frac{(R(118) \cdot R(114)) + (R(118) \cdot R(264))}{(R(114) \cdot R(264)) + (R(114) \cdot R(118)) + (R(264) \cdot R(118))} \right] \cdot V_C \quad (34)$$

By similar analysis:

$$V_F = \left[ \frac{R}{R + R(114)} \right] \cdot V_C \quad (35)$$

Where the resistance R is as defined in equation (26). Substituting equation (26) into equation (35) yields:

$$V_F = \left[ \frac{(R(118) \cdot R(294))}{(R(118) \cdot R(294)) + (R(114) \cdot R(118)) + (R(294) \cdot R(114))} \right] \cdot V_C \quad (36)$$

By design, R(294) is set equal to R(264) which makes the denominator of (34) equal to the denominator of (36). Equation (34) can be divided by equation (36) and the result is:

$$\frac{V_{F'}}{V_F} = \left[ \frac{R(114) + R(264)}{R(294)} \right] \quad (37)$$

By design, R(264) is set equal to R(294). Also, the value of R(264)=R(294)=1K ohms. Thus, equation (37) reduces to:

$$\left[ \frac{V_{F'}}{V_F} \right] = R(114) + 1 \quad (38)$$

solving equation (38) for R114:

$$R(114) = \left[ \frac{V_{F'}}{V_F} \right] - 1 \quad (39)$$

where the units of R114 are K ohms. This method for determining the value of resistor R(114) is preferred for two reasons: (1) only one channel of the A/D needs to be read thereby eliminating errors associated with variations in $V_C$ from equation (29); (2) due to the division of the single channel, the variations in resistance of R(210) and R(212) are virtually eliminated while variations in resistors R(156) and R(158) are also eliminated as the measurement of $V_C$ is eliminated.

It can be appreciated that the same approach can be used to measure R(118) by noting that:

$$V_C - V_{F''} = \left[ \left[ \frac{(R(114) \cdot R(264)) + (R(114) \cdot R(118)) + (R(264) \cdot R(118))}{(R(114) \cdot R(264)) + (R(114) \cdot R(118)) + (R(264) \cdot R(118))} \right] - \left[ \frac{(R(118) \cdot R(114)) + (R(118) \cdot R(264))}{(R(114) \cdot R(264)) + (R(114) \cdot R(118)) + (R(264) \cdot R(118))} \right] \right] \quad (40)$$

$$V_C - V_{F''} = \left[ \frac{(R(114) \cdot R(264))}{(R(114) \cdot R(264)) + (R(114) \cdot R(118)) + (R(264) \cdot R(118))} \right] \quad (41)$$

and $$V_C - V_{F'} = \left[ \left[ \frac{(R(118) \cdot R(294)) + (R(114) \cdot R(118)) + (R(294) \cdot R(114))}{(R(118) \cdot R(294)) + (R(114) \cdot R(118)) + (R(294) \cdot R(114))} \right] - \left[ \frac{(R(118) \cdot R(294))}{(R(118) \cdot R(294)) + (R(114) \cdot R(118)) + (R(294) \cdot R(114))} \right] \right] \cdot V_C \quad (42)$$

$$V_C - V_F = \left[ \frac{(R(114) \cdot R(118)) + (R(294) \cdot R(114))}{(R(118) \cdot R(294)) + (R(114) \cdot R(118)) + (R(294) \cdot R(114))} \right] \cdot V_C \quad (43)$$

Dividing (43) by (41) with R(294)=R(264)=1K $\Omega$ yields:

$$\left[ \frac{V_C - V_F}{V_C - V_{F''}} \right] = R(118) + 1 \quad (44)$$

Solving for R118 leaves:

$$R(118) = \left[ \frac{V_{F''} - V_F}{V_C - V_{F''}} \right] \quad (45)$$

While equation (45) algorithmically appears simpler than equation (28), it has been found that the determination according to equation (28) is more accurate.

After this last test is performed, the microcomputer calculates the resistance of squib 102 as described in the above-incorporated U.S. Pat. No. 4,825,148.

The A/D converter is an eight bit converter that serially outputs a binary number having a value between 0 and 255. A binary number of 0 is output when 0 volts is measured. A binary number of 255 is output when the measured voltage is equal to a reference voltage of the A/D converter. As the voltage values $V_F$, $V_{F'}$, $V_{F''}$ get close to 0 or as the quantity $(V_F - V_F)$ or $V_F - V_{F'})$ or $(V_C - V_{F'})$ etc. get close to 0, an uncertainty results due to the operating characteristics of the A/D converter. The A/D converter typically has a measurement uncertainty of ±1. If, as a result of the measured voltage, the A/D converter would output a binary number of 100, the ±1 uncertainty represents a ±1% error. However, as the voltage nears 0 and, for example, the A/d converter outputs a binary number of 5, the ±1 uncertainty is equal to a ±20% uncertainty in the measurement. Therefore, extremely small voltage values make measurement impractical using the A/D converter. It is for this reason that the present invention performs the monitored tests in step 460 to initially determine whether the voltage values are within a range that would yield a meaningful measurement with the A/D converter.

The program branches from step 480 to step 482 where a determination is made as to whether or not all the calculated resistance values done in step 480 are within predetermined limits. If a determination in step 482 is negative, the program proceeds to step 464 where the indicator is actuated. A determined error in a resistance value would be recorded in the EEPROM in step 466 and the time of failure would be monitored and recorded in step 468. From step 468 or from an affirmative determination in step 482, a determination is made in step 470 as to whether the discharge flag is set. If the discharge flag is set, the program proceeds to step 486 where a determination is made as to whether the discharge time has elapsed.

The determination as to how long the capacitor is to be discharged before a final measurement of the voltage $V_C$ is taken for capacitance test purposes is determined by the expectant discharge curve of the capacitors. The voltage $V_C$, ignoring the voltage drops across diodes 124, 128, when Q1 and Q2 are OFF, can be approximated as:

$$V_C = \frac{26.3 \cdot (R(114) + R(118))}{(R(114) + R(118)) \cdot R(126)} \quad (46)$$

Assuming the resistance values for resistors 114, 118 are both 5 kohms resistors, and the resistor 126 is a 511 ohm resistor, then $V_C$ is equal to 25 volts DC. When transistors Q1 and Q2 are both ON, the voltage across the capacitor will attempt to discharge to a voltage value $V_{c'}$, again ignoring the voltage drops across diodes 124, 128, which can be expressed as:

$$V_C = \frac{26.3(R(114)//R(264) + R(118)//R(294)}{(R(114)//R(264) + R(118)//R(294)) + R(126)} \quad (47)$$

The symbol $\|$ is used to indicate "in parallel with."

Assuming that R(264) and R(294) are both 1 kohm resistors, this yields a value of $V_C = 20.19$. The time constant $\tau$ for discharges equal to:

$$\tau = (C(130)) \cdot ((R(114) \| R(264) + R(118) \| R(294)) \| R(126) \quad (48)$$

It is desirable to pick a point along the discharge curve where the slope of the discharge voltage vs. time is still significant, i.e., before the curve flattens out. This reduces possible measurement errors. In the example discussed above, the time period should be well before the voltage is expected to drop to 20.1 volts. It has been found that a discharge time of 295 milliseconds and a charge time of approximately 7 seconds were needed for testing purposes. It is preferable that the capacitor 130 not be discharged below a level necessary to fire the squib, i.e., even a fully discharged level of the capacitor by the switching circuit should be sufficient to fire the squib.

Referring to FIG. 3B, a time period between $T_0$ and time $T_A$ is approximately equal to 25 milliseconds with switching of the transistors Q1 and Q2 occurring approximately every two milliseconds. The time period between each $T_0$ and $T_{0'}$, etc. is approximately 30 milliseconds. If the total discharge time is 295 milliseconds, it will be appreciated that ten complete tests of the resistance values can occur during the discharge period.

Figure 4B:
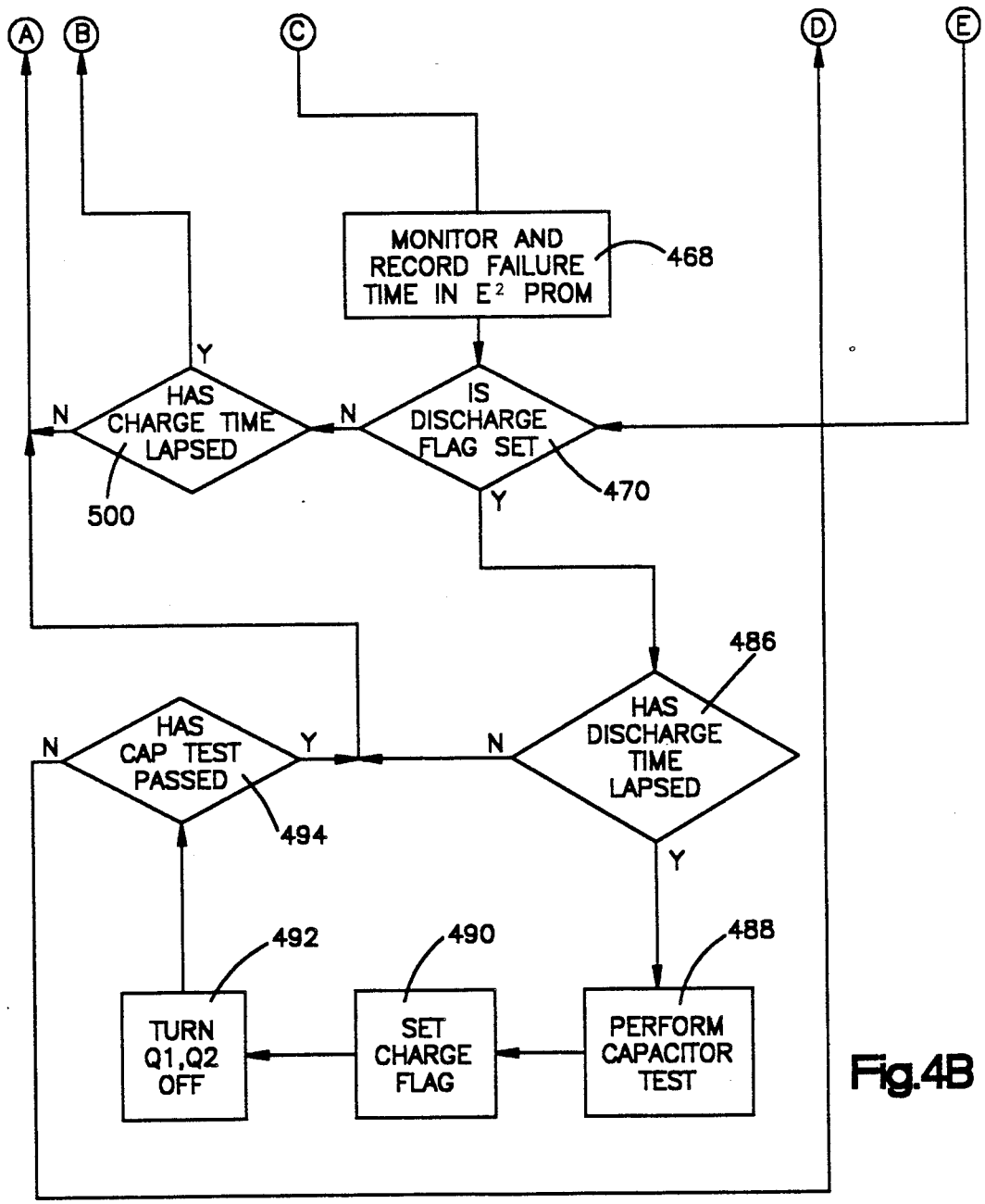
Figure 5:
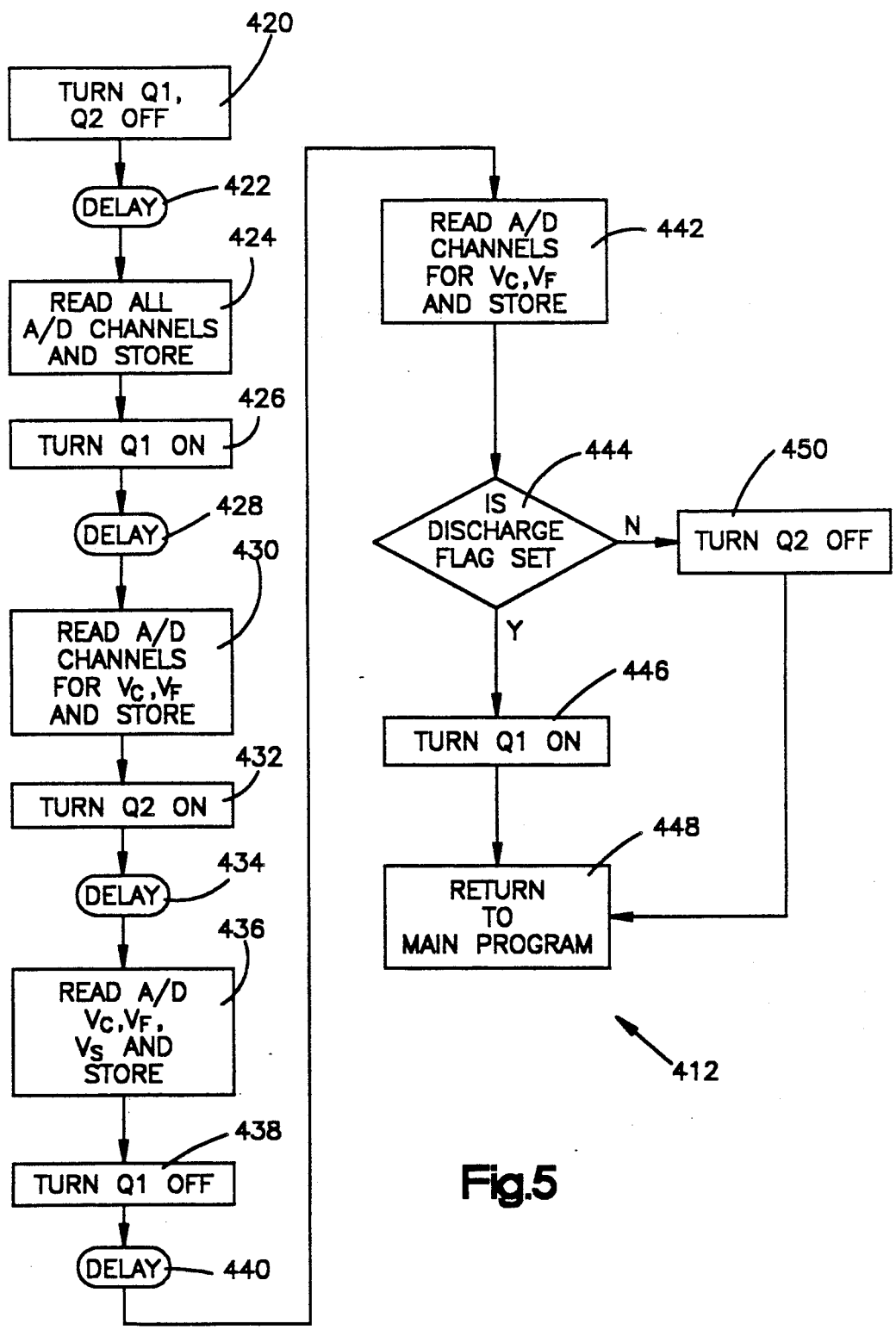
FIG. 5 is a flow chart illustrating in greater detail the operational logic performed in one step of FIG. 4.

Referring to FIGS. 4A and 4B, if the discharge time has not elapsed, e.g., 295 milliseconds, the program returns to step 410 where the microcomputer delays, e.g., 24.9 milliseconds, before beginning to again sequence the transistors Q1 and Q2. If the discharge time has elapsed, the program proceeds from step 486 to step 488 where the capacitance test is performed. The capacitance test is to measure the voltage $V_C$ and to determine if the adjusted $\Delta V$ has been exceeded, i.e., determine if the voltage $V_C$ measured in step 404 minus $V_C$ measured during last sequence is greater than $\Delta V$ adjusted.

In step 490, a charge flag is set and the transistors Q1 and Q2 are turned OFF in step 492. When this occurs, the capacitor 130 begins to charge. A determination is made in step 494 as to whether the capacitor test has passed. If the determination in step 494 is negative, the program proceeds to step 464 where the indicator light is actuated, the failure is recorded in the EEPROM in step 466 and the time of failure is recorded in step 468. If the capacitor test has passed, the program proceeds from step 494 to step 410 where the microcomputer delays.

FIG. 3C depicts the charging cycle where at time $T_1$ the transistors Q1 and Q2 are both OFF for a majority time period of each test cycle and the capacitors are charging. At time $T_E$, the transistor sequence begins in step 412. The complete sequence occurs at the time periods $T_E$, $T_F$, $T_G$, $T_H$, and $T_I$. The remainder of the program proceeds in a similar manner as described with regard to the discharge cycle. The monitor tests are performed in step 460. If all the monitor tests pass, the resistor values are calculated in step 480. When the inquiry is made in step 470 as to whether the discharge flag is set, a negative determination occurs during the charging cycle in which the program branches to step 500 where a determination is made as to whether or not the charge time has elapsed.

In the example given, charge time takes approximately 7 seconds. If the charge time has not elapsed, the program proceeds to step 410 and the cycle is again repeated. If the charge time has elapsed, the program proceeds to step 406 where the discharge flag is set and the cycle repeats. If resistance calculations are made every 30 milliseconds, approximately 230 complete resistance test cycles are completed during the charging period of the capacitors.

Although the invention has been described with reference to a preferred embodiment, those skilled in the art will appreciate alterations, modifications and improvements to such preferred embodiment. Such alterations, modifications, and improvements are intended to be covered by the scope of the appended claims.

Having described a preferred embodiment of the invention, we claim:

1. An apparatus for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance is greater than a predetermined value, a sufficient electrical potential would be available to fire the squib from the capacitor's stored electrical energy when the first and second inertia switches close, said apparatus comprising:

means for monitoring the voltage value across the capacitor at a time $T_0$, said voltage value across the capacitor at time $T_0$ being equal to $V_C(T_0)$;

means for partially discharging said capacitor starting from the time $T_0$ for a predetermined time period ending at a time $T_1$;

means for monitoring the voltage value of the charge remaining across said capacitor at time $T_1$, the monitored voltage value across the capacitor at time $T_1$ being a voltage value equal to $V_C(T_1)$;

means for determining a value according to algorithm $$\frac{V_C(T_0) + V_C(T_1)}{V_C(T_0) - V_C(T_1)};$$

means for comparing said determined value against a predetermined limit and for providing a signal indicative of the comparison; and means for providing a failure indication to the vehicle operator if the comparing means indicates that said determined value is less than said predetermined limit.

2. The apparatus of claim 1 wherein said means for partially discharging said capacitor includes a solid state switching device connected in series with a resistor, the series combination of the switching device and the resistor connected in parallel with said capacitor and a timing circuit controllably connected to the solid state switching device.

3. The apparatus of claim 2 wherein said means for monitoring the voltage value across said capacitor includes a voltage dividing network connected in parallel with said capacitor and an analog-to-digital converter connected to the voltage dividing network.

4. The apparatus of claim 3 wherein said means for comparing includes a microcomputer connected to said analog-to-digital converter, said microcomputer storing said predetermined limit within its internal memory.

5. An apparatus for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance is greater than a predetermined value, a sufficient electrical potential would be available to fire the squib from the capacitor's stored electrical energy when the first and second inertia switches close, said apparatus comprising:

means for monitoring the voltage value across the capacitor at a time $T_0$, said voltage value across the capacitor at time $T_0$ being equal to $V_C(T_0)$;

means for partially discharging said capacitor starting from the time $T_0$ for a predetermined time period ending at a time $T_1$;

means for monitoring the voltage value of the charge remaining across said capacitor at time $T_1$, the monitored voltage value across the capacitor at time $T_1$ being a voltage value equal to $V_C(T_1)$;

means for determining a value according to algorithm $$\frac{V_C(T_1)}{V_C(T_0)}$$

means for comparing said determined value against a predetermined limit and for providing a signal indicative of the comparison; and means for providing a failure indication to the vehicle operator if the comparing means indicates that said determined value is less than said predetermined limit.

6. The apparatus of claim 5 wherein said means for partially discharging said capacitor includes a solid state switching device connected in series with a resistor, the series combination of the switching device and the resistor connected in parallel with said capacitor and a timing circuit controllably connected to the solid state switching device.

7. The apparatus of claim 6 wherein said means for monitoring the voltage value across said capacitor includes a voltage dividing network connected in parallel with said capacitor and an analog-to-digital converter connected to the voltage dividing network.

8. The apparatus of claim 7 wherein said means for comparing includes a microcomputer connected to said analog-to-digital converter, said microcomputer storing said predetermined limit within its internal memory.

9. An apparatus for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance value C is greater than a predetermined value, a sufficient electrical potential would be available to fire the squib from the capacitor's stored electrical energy when the first and second inertia switches close, said apparatus comprising:

means for monitoring the voltage value across the capacitor at a time $T_0$, said voltage value across the capacitor at time $T_0$ being equal to $V_C(T_0)$;

means for partially discharging said capacitor for a predetermined time period ending at a time $T_1$, said means for partially discharging said capacitor including a solid state switching device connected in series with a resistor, the series combination of the switching device and the resistor being connected in parallel with said capacitor and a timing circuit controllably connected to the solid state switching device for controlling the ON time of said switching device, said source of electrical energy remaining continuously connected to said capacitor during the testing of said capacitor;

means for monitoring the voltage value of the charge remaining across said capacitor at time $T_1$, the monitored voltage value across the capacitor at time $T_1$ being a second voltage value equal to $V_C(T_1)$;

means for determining the capacitance value C according to algorithm $$C = \frac{t}{R \cdot \ln\left[\dfrac{V_C(T_0) - V_f}{V_C(T_1) - V_f}\right]}$$

where t = the discharge time = $(T_1 - T_0)$, R = the equivalent charge/discharge composite resistance, and $V_f$ = the final voltage value across the capacitor if said means for partially discharging said capacitor were to remain ON for a substantial time period; and means for providing a failure indication to the vehicle operator if said determined capacitance value is less than a predetermined limit.

10. The apparatus of claim 9 wherein said means for monitoring the voltage value across said capacitor includes a voltage dividing network, connected in parallel with said capacitor and an analog-to-digital converter connected to the voltage dividing network 11. The apparatus of claim 10 wherein said means for comparing includes a microcomputer connected to said analog-to-digital converter, said microcomputer storing said predetermined limit in its internal memory.

12. An apparatus for testing a storage capacitor in an airbag restraint system of the type including a squib, a first inertia switch connected to one terminal of the squib and to the storage capacitor, a second inertial switch connected to the other terminal of the squib and to electrical ground, means for connecting the capacitor to a source of electrical energy so as to charge the capacitor to a voltage value of such magnitude that, if the capacitor's capacitance value C is greater than a predetermined value, a sufficient electrical potential would be available to fire the squib from the capacitor's stored electrical energy when the first and second inertia switches close, said apparatus comprising:

means for monitoring the voltage value across the capacitor at a time $T_0$, said voltage value across the capacitor at time $T_0$ being equal to $V_C(T_0)$;

means for partially discharging said capacitor for a predetermined time period ending at a time $T_1$, said means for partially discharging said capacitor including a solid state switching device connected in series with a test resistor, the series combination of the switching device and the test resistor being connected in parallel with said capacitor and a timing circuit controllably connected to the solid state switching device for controlling the ON time of said switching device, said source of electrical energy remaining continuously connected to said capacitor during the testing of said capacitor;

means for monitoring the voltage value of the charge remaining across said capacitor at time $T_1$, the monitored voltage value being a second voltage value equal to $V_C(T_1)$;

means for determining the capacitance value C according to algorithm $$C = \frac{t}{2R} \cdot \left[\left(\frac{V_C(T_0) + V_C(T_1)}{V_C(T_0) - V_C(T_1)}\right) - \left(\frac{2V_f}{V_C(T_0) - V_C(T_1)}\right)\right]$$

where R = the charge/discharge composite resistance, t = the discharge time of the capacitor = $(T_1 - T_0)$, and $V_f$ = the final voltage value across the capacitor if said means for partially discharging said capacitor were to remain ON for a substantial time period; and means for providing a failure indication to the vehicle operator if said determined capacitance value is less than a predetermined limit.

13. The apparatus of claim 12 wherein said means for monitoring the voltage value across said capacitor includes a voltage dividing network, connected in parallel with said capacitor and an analog-to-digital converter connected to the voltage dividing network.

14. The apparatus of claim 13 wherein said means for comparing includes a microcomputer connected to said analog-to-digital converter, said microcomputer storing said predetermined limit in its internal memory.

15. An apparatus for testing an airbag restraint system of the type including a squib, a first inertia switch connected to one terminal of the squib and to a source of electrical energy, a second inertia switch connected to the other terminal of the squib and to electrical ground, each of the inertia switches including an associated resistor connected in parallel across its associated switch, the resistor associated with said first inertia switch having a resistance value defined as R(IS1), said apparatus comprising:

a first switching network connected in parallel with the first inertia switch, said first switching network including a first actuatable solid state switch connected in series with a first test resistor having a known resistance value for, when actuated, connecting said first test resistor in parallel with the associated resistor of the first inertia switch;

a second switching network connected in parallel with the second inertia switch, said second switching network including a second actuatable solid state switch connected in series with a second test resistor having a known resistance value for, when actuated, connecting the second test resistor in parallel with the associated resistor of the second inertia switch, the resistance value of said second test resistor being equal to the resistance value of said first test resistor;

means for controlling said first and second solid state switches so as (i) in a first condition having said second solid state switch ON and said first solid state switch OFF, and (ii) in a second condition, having said first solid state switch ON and said second solid state switch OFF;

means for monitoring the voltage value of the source of electrical energy and for monitoring the voltage values at a junction between the squib and one of the inertia switches when one of said solid state switching devices are in the first and second conditions, the monitored voltage value for said first condition being defined as $V_F$ and the monitored voltage value for said second condition being defined as VF"; and means for calculating the resistance value of the resistor associated with the first inertia switch from the monitored voltage values solving an algorithm according to:

$$R(IS1) = \left[\frac{V_{F''}}{V_F} - 1\right] \cdot K$$

where K is a constant having a value which is functionally related to the value of the first and second test resistors.

16. The apparatus of claim 15 wherein the resistance values of both said first and second test resistors are equal to one-thousand Ohms and said calculating means calculates the resistance value of the resistor associated with the first inertia switch according to the algorithm $$R(IS1) = \left[\frac{V_{F''}}{V_F} - 1\right]$$

where $$\left[\frac{V_{F''}}{V_F} - 1\right]$$

is in one-thousand Ohms units.

17. An apparatus for testing an airbag restraint system of the type including a squib, a first inertia switch connected to one terminal of the squib and to a source of electrical energy having a value $V_C$, a second inertia switch connected to the other terminal of the squib and to electrical ground, each of the inertia switches including an associated resistor connected in parallel across its associated switch, the resistor associated with said second inertia switch having a value defined as R(IS2), said apparatus comprising:
 a first switching network connected in parallel with the first inertia switch, said first switching network including a first actuatable solid state switch connected in series with a first test resistor having a known resistance value for, when actuated, connecting said first test resistor in parallel with the associated resistor of the first inertia switch;
 a second switching network connected in parallel with the second inertia switch, said second switching network including a second actuatable solid state switch connected in series with a second test resistor having a known resistance value for, when actuated, connecting the second test resistor in parallel with the associated resistor of the second inertia switch, the resistance value of said second test resistor being equal to the resistance value of said first test resistor;
 means for controlling said first and second solid state switches so as (i) in a first condition having said second solid state switch ON and said first solid state switch OFF, and (ii) in a second condition, having said first solid state switch ON and said second solid state switch OFF;
 means for monitoring the voltage value of the source of electrical energy and for monitoring the voltage values at a junction between the squib and one of the inertia switches when one of said solid state switching devices are in the first and second conditions, the monitored voltage value for said first condition being defined as $V_F$ and the monitored voltage value for said second condition being defined as $V_{F''}$; and
 means for calculating the resistance value of the resistor associated with the second inertia switch from the monitored voltage values solving an algorithm according to:

$$R(IS2) = \left[\frac{V_{F''} - V_F}{V_C - V_{F''}}\right] \cdot K$$

where K is a constant having a value which is functionally related to the value of the first and second test resistors.

18. The apparatus of claim 17 wherein the resistance values of both said first and second test resistors are equal to one-thousand Ohms and said calculating means solves a reduced algorithm according to $$R(IS2) = \left[\frac{V_{F''} - V_F}{V_C - V_{F''}}\right]$$

where $$\left[\frac{V_{F''} - V_F}{V_C - V_{F''}}\right]$$

is in one-thousand Ohms units.

19. A method for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance is greater than a predetermined value, a sufficient electrical potential would be available to fire the squib from the capacitor's stored electrical energy when the first and second inertia switches close, said method comprising the steps of:
 monitoring the voltage value across the capacitor at a time $T_0$;
 defining the monitored voltage value across the capacitor at time $T_0$ as being equal to $V_C(T_0)$;
 partially discharging the capacitor starting from the time $T_0$ for a predetermined time period ending at a time $T_1$;
 monitoring the voltage value of the charge remaining across said capacitor at time $T_1$;
 defining the monitored voltage value across the capacitor at time $T_1$ as being equal to $V_C(T_1)$;
 determining a value according to algorithm $$\frac{V_C(T_0) + V_C(T_1)}{V_C(T_0) - V_C(T_1)};$$

comparing the determined value against a predetermined limit and providing a signal indicative of the comparison; and
 providing a failure indication to the vehicle operator if the step of comparing indicates that the determined value is less than the predetermined limit.

20. A method for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such magnitude that, if the capacitor's capacitance is greater than a predetermined value, a sufficient electrical potential would be available to fire the squib from the capacitor's stored electrical energy when the first and second inertia switches close, said method comprising the steps of:

monitoring the voltage value across the capacitor at a time $T_0$;

defining the monitored voltage value across the capacitor at time $T_0$ as being equal to $V_C(T_0)$;

partially discharging the capacitor starting from the time $T_0$ for a predetermined time period ending at a time $T_1$;

monitoring the voltage value of the charge remaining across said capacitor at time $T_1$;

defining the monitored voltage value across the capacitor at time $T_1$ as being equal to $V_C(T_1)$;

determining a value according to algorithm $$\frac{V_C(T_1)}{V_C(T_0)}$$

comparing the determined value against a predetermined limit and providing a signal indicative of the comparison; and providing a failure indication to the vehicle operator if the step of comparing indicates that the determined value is less than the predetermined limit.

21. A method for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a voltage value of such a magnitude that, if the capacitor's capacitance value C is greater than a predetermined value, a sufficient electrical potential would be available to fire the squib from the capacitor's stored electrical energy when the first and second inertia switches close, said method comprising the steps of:

monitoring the voltage value across the capacitor at a time $T_0$;

defining the monitored voltage value across the capacitor at time $T_0$ as being equal to $V_C(T_0)$;

partially discharging the capacitor for a predetermined time period ending at a time $T_1$ using a solid state switching device connected in series with a test resistor, the series combination of the switching device and the test resistor being connected in parallel with said capacitor;

controlling the ON time of said switching device, said source of electrical energy remaining continuously connected to said capacitor during the testing of said capacitor;

monitoring the voltage value of the charge remaining across the capacitor at time $T_1$;

defining the monitored voltage value across the capacitor at time $T_1$ as being a voltage value equal to $V_C(T_1)$;

determining the capacitance value C according to algorithm $$C = \frac{t}{R \cdot \ln\left[\frac{V_C(T_0) - V_f}{V_C(T_1) - V_f}\right]}$$

where t = the discharge time = $(T_1 - T_0)$, R = the equivalent charge/discharge composite resistance, and $V_f$ = the final voltage value across the capacitor if the step of partially discharging the capacitor were to remain ON for a substantial time period; and providing a failure indication to the vehicle operator if the determined capacitance value is less than a predetermined limit.

22. A method for testing a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value of such magnitude that, if the capacitor's capacitance value C is greater than a predetermined value, a sufficient electrical potential would be available to fire the squib from the capacitor's stored electrical energy when the first and second inertia switches close, said method comprising the steps of:

monitoring the voltage value across the capacitor at a time $T_0$;

defining the monitored voltage value across the capacitor at time $T_0$ as being equal to $V_C(T_0)$;

partially discharging said capacitor for a predetermined time period ending at a time $T_1$ using a solid state switching device connected in series with a test resistor, the series combination of the switching device and the test resistor being connected in parallel with the capacitor;

controlling the ON time of the switching device, the source of electrical energy remaining continuously connected to the capacitor during the testing of the capacitor;

monitoring the voltage value of the charge remaining across said capacitor at time $T_1$;

defining the monitored voltage value across the capacitor at time $T_1$ as being a second voltage value equal to $V_C(T_1)$;

determining the capacitance value C according to algorithm $$C = \frac{t}{2R} \cdot \left[\left(\frac{V_C(T_0) + V_C(T_1)}{V_C(T_0) - V_C(T_1)}\right) - \left(\frac{2V_f}{V_C(T_0) - V_C(T_1)}\right)\right]$$

where R = the charge/discharge composite resistance, t = the discharge time of the capacitor = $(T_1 - T_0)$, and $V_f$ = the final voltage value across the capacitor if the step of partially discharging the capacitor were to remain ON for a substantial time period; and providing a failure indication to the vehicle operator if the determined capacitance value is less than a predetermined limit.

23. A method for testing an airbag restraint system of the type including a squib, a first inertia switch connected to one terminal of the squib and to a source of electrical energy, a second inertia switch connected to the other terminal of the squib and to electrical ground, each of the inertia switches including an associated resistor connected in parallel across its associated switch, the resistor associated with the first inertia switch having a resistance value defined as R(IS1), said method comprising the steps of:

provided a first switching network connected in parallel with the first inertia switch, the first switching network including a first actuatable solid state switch connected in series with a first test resistor having a known resistance value for, when actuated, connecting the first test resistor in parallel with the associated resistor of the first inertia switch;

providing a second switching network connected in parallel with the second inertia switch, the second switching network including a second actuatable solid state switch connected in series with a second test resistor having a known resistance value for, when actuated, connecting the second test resistor in parallel with the associated resistor of the second inertia switch, the resistance value of the second test resistor being equal to the resistance value of the first test resistor;

controlling the first and second solid state switches so as (i) in a first condition having the second solid state switch ON and the first solid state switch OFF, and (ii) in a second condition, having the first solid state switch ON and the second solid state switch OFF;

monitoring the voltage value of the source of electrical energy;

monitoring the voltage values at a junction between, the squib and one of the inertia switches when one of said solid state switching devices are in the first and second conditions, the monitored voltage value for said first condition being defined as $V_F$ and the monitored voltage value for said second condition being defined as $V_{F'}$; and calculating the resistance value of the resistor associated with the first inertia switch from the monitored voltage values by solving an algorithm according to:

$$R(IS1) = \left[ \frac{V_{F'}}{V_F} - 1 \right] \cdot K$$

where K is a constant having a value which is functionally related to the value of the first and second test resistors.

24. The method of claim 23 further including the steps of setting the resistance values of both the first and second test resistors equal to one-thousand Ohms and calculating the resistance value of the resistor associated with the first inertia switch according to the algorithm $$R(IS1) = \left[ \frac{V_{F'}}{V_F} - 1 \right]$$

where $$\left[ \frac{V_{F'}}{V_F} - 1 \right]$$

is in one-thousand Ohms units.

25. A method for testing an airbag restraint system of the type including a squib, a first inertia switch connected to one terminal of the squib and to a source of electrical energy having a value $V_C$, a second inertia switch connected to the other terminal of the squib and to electrical ground, each of the inertia switches including an associated resistor connected in parallel across its associated switch, the resistor associated with the second inertia switch having a value defined as R(IS2), said method comprising the steps of:

providing first switching network connected in parallel with the first inertia switch, the first switching network including a first actuatable solid state switch connected in series with a first test resistor having a known resistance value for, when actuated, connecting the first test resistor in parallel with the associated resistor of the first inertia switch;

providing second switching network connected in parallel with the second inertia switch, the second switching network including a second actuatable solid state switch connected in series with a second test resistor having a known resistance value for, when actuated, connecting the second test resistor in parallel with the associated resistor of the second inertia switch, the resistance value of the second test resistor being equal to the resistance value of the first test resistor;

controlling the first and second solid state switches so as (i) in a first condition having the second solid state switch ON and the first solid state switch OFF, and (ii) in a second condition, having the first solid state switch ON and the second solid state switch OFF;

monitoring the voltage value of the source of electrical energy;

monitoring the voltage values at a junction between the squib and one of the inertia switches when one of the solid state switching devices are in the first and second conditions, the monitored voltage value for the first condition being defined as $V_F$ and the monitored voltage value for said second condition being defined as $V_{F'}$; and calculating the resistance value of the resistor associated with the second inertia switch from the monitored voltage values solving an algorithm according to:

$$R(IS2) = \left[ \frac{V_{F'} - V_F}{V_C - V_{F'}} \right] \cdot K$$

where K is a constant having a value which is functionally related to the value of the first and second test resistors.

26. The method of claim 25 further including the steps of selecting the resistance values of both the first and second test resistors to be equal to one-thousand Ohms and calculating a reduced algorithm according to $$R(IS2) = \left[ \frac{V_{F'} - V_F}{V_C - V_{F'}} \right]$$

where $$\left[ \frac{V_{F'} - V_F}{V_C - V_{F'}} \right]$$

is in one-thousand Ohms units.

* * * * *